Aug. 2, 1966   R. T. FOSTER   3,264,546
TEMPERATURE CONTROL OF BATTERIES
Filed Nov. 13, 1963   2 Sheets-Sheet 1

United States Patent Office 3,264,546
Patented August 2, 1966

3,264,546
TEMPERATURE CONTROL OF BATTERIES
Robert Thomas Foster, Solihull, England, assignor to Joseph Lucas (Industries) Limited, Birmingham, England
Filed Nov. 13, 1963, Ser. No. 323,375
8 Claims. (Cl. 320—35)

It is well known that in sub-zero temperatures it is difficult to charge a battery until the temperature of the battery electrolyte has been raised, and it has previously been proposed to pass an alternating current through a battery to raise the temperature of the battery electrolyte, a thermally sensitive switch being provided for breaking the A.C. heating circuit when the temperature of the battery electrolyte reaches a predetermined value.

The provision of a satisfactory thermally sensitive switch poses considerable difficulty. Ideally, the switch should be mounted in the battery electrolyte, but this course is impractical. An alternative is to mount the switch in contact with the battery casing, but this arrangement has been found to be insufficiently accurate.

The object of the present invention is to provide improved means for controlling an alternating heating current to a pair of batteries connected in series in an A.C. heating circuit.

Means according to the invention comprises a conductor connected in series with the batteries and having physical characteristics such that alternating current flowing through the conductor to the batteries will cause the temperature of the conductor to vary in substantially the same manner as the temperature of the electrolyte of the batteries, and a thermally sensitive switch in thermal contact with the conductor and arranged to interupt the A.C. circuit when the temperature of said conductor reaches a predetermined value.

Figure 1:
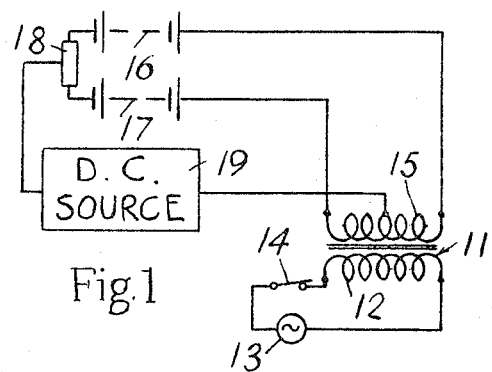
Figure 2:
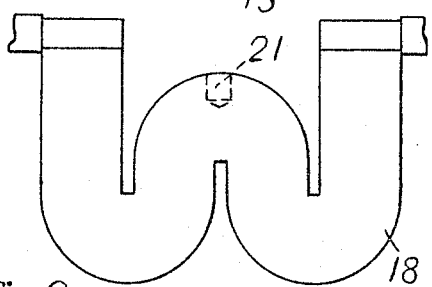
Figure 3:
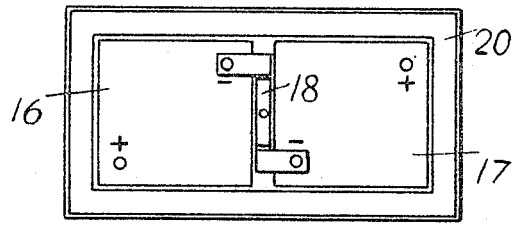
Figures 4, 5:
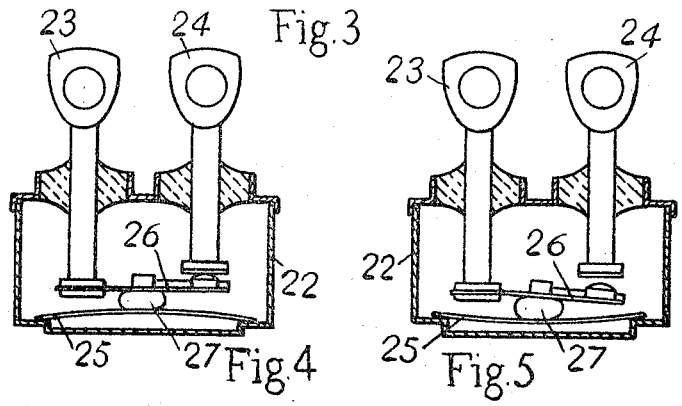
Figure 6:
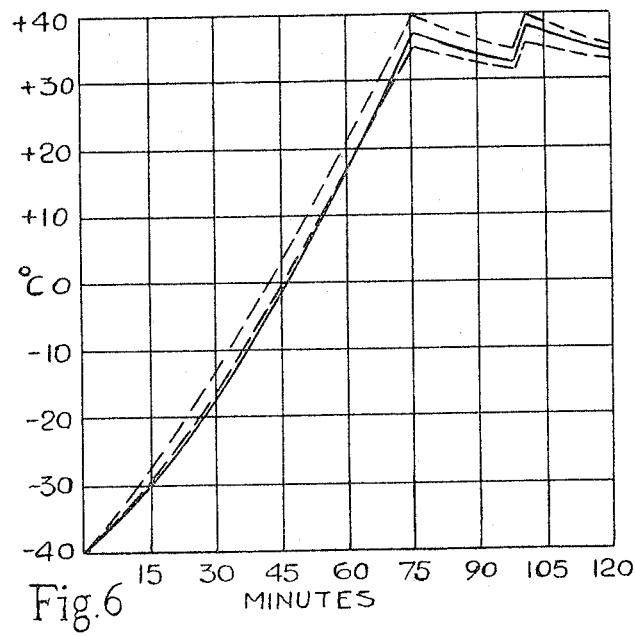
Figure 7:
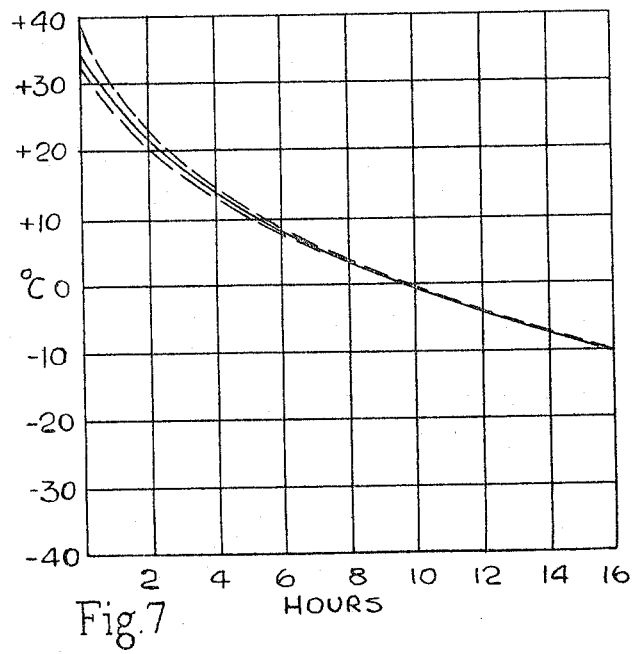

An example of the invention is illustrated in the accompanying drawings, in which FIGURE 1 is a circuit diagram, FIGURE 2 is a view illustrating the conductor, FIGURE 3 shows the conductor interconnecting a pair of batteries, FIGURES 4 and 5 respectively are views of the thermally sensitive switch in its closed and open positions, and FIGURES 6 and 7 respectively are warming and cooling graphs.

Referring first to FIGURE 1, there is provided a transformer 11 having the ends of its primary winding 12 connected to an A.C. source 13 through a normally closed thermally sensitive switch 14. Opposite ends of the secondary winding 15 of the transformer are connected respectively to the positive terminals of a pair of batteries 16, 17, the negative terminals of which are interconnected through a conductor 18. Moreover, a point on the conductor is connected through a D.C. source 19 to the midpoint of the winding 15.

The physical characteristics of the conductor 18 are chosen so that the thermal response of the conductor to the current flowing through it closely follows the thermal response of the electrolyte of the batteries. For this purpose the conductor must be made as long as practicable in order to avoid undesirable thermal influence of the terminals connecting the conductor 18 to the batteries 16, 17, and a conductor of the shape illustrated in FIGURE 2 has been found to be suitable. The conductor is connected between the batteries 16, 17 in the manner indicated in FIGURE 3, and the conductor and batteries are accommodated in a thermally insulated housing 20.

The switch 14 is housed in a recess 21 (FIGURE 2) at the mid-point of the conductor 18. The recess 21, in addition to supporting the switch 14, increases the resistance of the conductor 18 in the vicinity of the switch 14, so that the switch is in contact with the part of the conductor 18 which responds most rapidly to temperature fluctuations.

The construction of the switch 14 is shown in FIGURES 4 and 5. The switch includes a housing 22 supporting a pair of fixed terminals 23, 24 and a temperature sensitive bimetallic disc 25. The disc 25 bears against an insulating member 27 secured to a resilient contact 26 which at one end is secured to the terminal 23. Below a predetermined temperature the disc 25 is bowed as shown in FIGURE 4 so that the other end of the contact 26 bears against the terminal 24 and the switch is closed. However, when the predetermined temperature is attained the disc 25 snaps to the position shown in FIGURE 5 to open the switch.

The operation of the arrangement described above is as follows: direct charging current flows through the batteries 16, 17 in parallel whilst alternating current flows through the batteries and conductor 18 so that the conductor is heated by the same amount as the battery electrolyte. At a predetermined temperature the switch 14 opens and breaks the heating circuit, but charging current continues to flow. If the temperature again falls below the predetermined value, the switch 14 closes and heating by the alternating current is resumed.

The design of the conductor 18 involves calculating the required cross-sectional area for the particular application, and conductors must be individually designed. The design of the conductor used in the example above described was determined as follows:

An approximate value for the cross-sectional area of the conductor was found from the formula:

$$a^2 = \frac{s \times I^2 \times t}{(T_2 - T_1) \times d \times h \times 4.2}$$

where $a$ is the required cross-sectional area in sq. cms.;
$s$, $d$, and $h$ are the specific resistance, density and specific heat of the material of the conductor, and $(T_2 - T_1)$ is the temperature rise in the pair of batteries resulting from flow of an alternating current of means value $I$ amperes for $t$ seconds.

The values of $(T_2 - T_1)$, $I$ and $t$ were found with the batteries in their normal environment, i.e., in this case the housing 20. A mean current of 220 amperes produced a rise of 60° C. in 1½ hours.

The conductor was formed from 10% antimonial lead, and the values of $s$, $d$ and $h$ were taken as $20 \times 10^{-6}$ chms./c.c., 0.031, and 11.4 gms./c.c. respectively. These values gave a result of 7.65 sq. cms. for $a$.

A conductor was made with this cross-section and then tested by passing the same alternating current through the conductor as was used for warming the batteries. The conductor was found to warm at 0.92 times the batteries, and so the cross-sectional area of the conductor was reduced to 0.92 times the former value. The conductor was then connected in the circuit shown in FIGURE 1, provision being made for measuring the electrolyte and conductor temperatures, and the warming and cooling graphs shown in FIGURES 6 and 7 respectively were obtained with the switch 14 opening at 37° C. The full line is the conductor temperature, whilst the lower and upper dotted lines are the electrolyte temperatures in the middle and at the top of the battery respectively. It will be seen that the conductor behaves thermally in a manner closely analogous to the electrolyte.

The heating effect of the direct current is small in relation to that of the alternating current, and can be ignored.

Having thus described my invention what I claim as new and desire to secure by Letters Patent is:

1. Means for controlling an A.C. heating current to a pair of batteries, comprising an A.C. heating circuit having said batteries in series therein, a conductor in series with said batteries, said conductor having physical characteristics such that alternating current flowing through the conductor to the batteries will cause the temperature of the conductor to vary in substantially the same manner as the temperature of the electrolyte of the batteries, and a normally closed thermally sensitive switch in thermal contact with said conductor and arranged to open above a predetermined temperature of said conductor, said switch being connected in the A.C. circuit.

2. Means as claimed in claim 1 in which the conductor and batteries are mounted in a thermally insulated housing.

3. Means for controlling an A.C. heating current to a pair of batteries, comprising an A.C. heating circuit including said batteries, a conductor in said heating circuit and interconnecting one terminal of each battery, said conductor having physical characteristics such that alternating current flowing through the conductor to the batteries will cause the temperature of the conductor to vary in substantially the same manner as the temperature of the electrolyte of the batteries, and a normally closed termally sensitive switch in thermal contact with said conductor and arranged to open above a predetermined temperature of said conductor, said conductor being connected in the A.C. heating circuit.

4. Means as claimed in claim 3 in which the conductor is sandwiched between the pair of batteries.

5. Means as claimed in claim 3 in which said switch is housed within a recess at the mid-point of the conductor.

6. Means as claimed in claim 3 including a thermally insulated housing containing the batteries and conductor.

7. Means for charging and heating a pair of batteries, comprising a transformer having a primary and secondary winding, means connecting opposite ends of said secondary winding to one pair of terminals of said batteries of like polarity, a conductor interconnecting the other pair of terminals of said batteries, said conductor having physical characteristics such that alternating current flowing through the conductor to the batteries will cause the temperature of the conductor to vary in substantially the same manner as the temperature of the battery electrolyte, a normally closed thermally sensitive switch in thermal contact with the conductor and arranged to open above a predetermined temperature of said conductor, an A.C. source connected in series with said switch between opposite ends of the primary winding, and D.C. source connected between the mid-point of said secondary winding and a point on said conductor.

8. Means for charging and heating a pair of batteries, comprising a transformer having a primary and secondary winding, means connecting opposite ends of said secondary winding to one pair of terminals of said batteries of like polarity, a conductor interconnecting the other pair of terminals of said batteries, said conductor having physical characteristics such that alternating current flowing through the conductor to the batteries will cause the temperature of the conductor to vary in substantially the same manner as the temperature of the battery electrolyte, a thermally insulated housing containing said batteries and the conductor, a normally closed thermally sensitve switch in said housing, said switch contained within a recess at the mid-point of said conductor, an A.C. source connected in series with said switch between opposite ends of the primary winding, and a D.C. source connected between the mid-point of said secondary winding and a point on said conductor.

References Cited by the Examiner
UNITED STATES PATENTS

| | | | |
|---|---|---|---|
| 2,489,293 | 11/1949 | Holmes | 200—138 |
| 2,710,936 | 6/1955 | Lowry et al. | 320—35 X |
| 2,802,980 | 8/1957 | Lapuyade | 320—36 |
| 3,100,827 | 8/1963 | Grimshaw | 200—138 X |

JOHN F. COUCH, *Primary Examiner.*

S. WEINBERG, *Assistant Examiner.*